V. J. ODHNER.
COUPLING FOR DETACHABLY CONNECTING COAXIAL SHAFTS.
APPLICATION FILED SEPT. 30, 1919.

1,332,229. Patented Mar. 2, 1920.

Inventor
V. J. Odhner
By H. R. Kerslake
Attorney

UNITED STATES PATENT OFFICE.

VALENTIN JAKOB ODHNER, OF GOTTENBORG, SWEDEN.

COUPLING FOR DETACHABLY CONNECTING COAXIAL SHAFTS.

1,332,229.     Specification of Letters Patent.     Patented Mar. 2, 1920.

Application filed September 30, 1919. Serial No. 327,539.

*To all whom it may concern:*

Be it known that I, VALENTIN JAKOB ODHNER, a subject of the King of Sweden, and resident of Vasaplatsen 1, Gottenborg, in the Kingdom of Sweden, have invented certain new and useful Improvements in Couplings for Detachably Connecting Coaxial Shafts, of which the following is a specification, reference being had therein to the accompanying drawing.

This invention relates to a detachable coupling device for substantially co-axial shafts or the like. The coupling device is adapted especially to connect the shaft located in the ordinary carriage of calculating machines, by means of which the registering disks are returned to their zero-position, and the shaft, by means of which those disks are returned to their zero-position, which indicate the number of revolutions of the calculating wheels, so that the said sets of disks may be returned to the zero-position either simultaneously by a single manipulation or separately.

Figure 1:
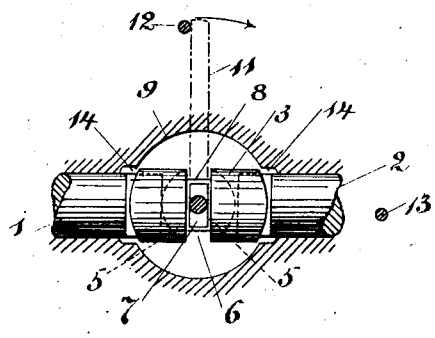
Figure 2:
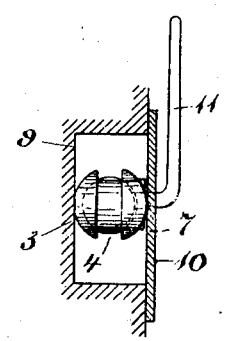
Figure 3:
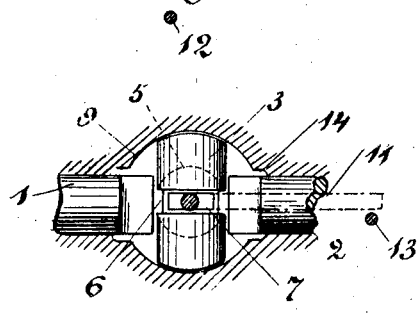
Figure 4:
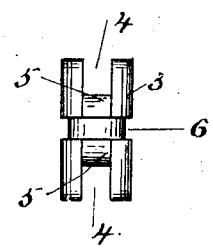

In the accompanying drawing a coupling device arranged in accordance with this invention is illustrated, in Figure 1 in a side view, in Fig. 2 in an end view and in Fig. 3 in a top view. Fig. 4 shows a detail.

1 and 2 are two co-axial shafts, which are to be connected. The ends of the said shafts, facing one another, are located at some distance from one another and flattened, two opposite sides being parallel. A coupling member 3 is located between the said ends, the said member consisting of a cylindrical piece, provided in its ends with grooves 4. The bottom surface 5 of each groove is cylindrical, having the center line located transversely of the cylindrical member 3 and centrally with relation to the same. A central groove 6 extends around the cylindrical member 3, into which a substantially fork shaped part 7 extends, which partially embraces the cylindrical portion 8, forming the bottom of the said groove 6. The coupling member 3 is rotatably mounted in a casing 9, which is cylindrical inside and constitutes a guide to the member 3. In order that the ends of the coupling member 3 may fit to the inner surface of the said casing, its ends form parts of a cylinder the center line of which is located transversely of the member 3 and centrally with relation to the same. The casing has a cover 10, in which a handle 11 is journaled, which extends from the fork shaped part 7 and by means of which the coupling member is shifted.

The coupling device operates in the following manner. In the position of the member 3, shown in Figs. 1 and 2, the ends of the shafts 1 and 2 extend into the end grooves 4 of the member 3, to which they fit. If now one of the shafts, for instance the shaft 1, is rotated, it carries with itself the member 3, which in its turn carries with itself the shaft 2. During the rotation of the member 3 its cylindrical portion 8 runs in the fork 7, which consequently does not prevent the member 3 from rotating. If the object of the shafts is to return the registering and indicating disks of a calculating machine to their zero-position, the shafts are rotated through a whole revolution for the performance of the said function. Consequently, the shafts are rotated until they arrive to the position shown in Figs. 1 and 2. For the disconnecting of the shafts the coupling member 3 is rotated by means of the handle 11 to the position shown in Fig. 3, in which it is out of engagement with the ends of the shafts 1 and 2. The shafts may now be rotated separately. While the coupling member 3 has the position shown in Fig. 3, it is prevented by the walls of the casing 9 from rotating around its longitudinal axis or from being dislocated in the said casing. Consequently, as the shafts are in their zero-position the coupling member 3 may be rotated and brought back into engagement with the ends of the shafts.

In order to render possible the rotating of the coupling member 3, while in the position shown in Fig. 1, recesses 14 are provided for the ends of the member 3 in the casing. As the member 3 is rotated together with the shafts it is sufficiently guided by the fork 7 and the bottom of the casing 9 and, it may be, by the cover 10 of the same. The two positions of the coupling member are determined by stationary abutments 12, 13 and the handle 11.

The invention may, evidently, be modified in some respects without exceeding the limits of the same. For instance the ends of the shafts 1 and 2 may be fork shaped and the ends of the coupling member 3 provided with tongues, by means of which it may engage the shafts.

Having now described my invention, what

I claim as new and desire to secure by Letters Patent is:

1. A coupling for detachably connecting co-axial shafts having engageable ends, comprising an independently rotatable coupling member located between the ends of the shafts, and means for rotating the member around a transverse axis so as to releasably engage the engageable ends of the shafts.

2. In a device as claimed in claim 1 wherein a casing is employed and provided with a cylindrical interior with which the ends of the member contact.

3. A device as claimed in claim 1 wherein the means for rotating the member consists in the member being provided with an annular groove and a fork shaped element engaging the groove.

4. In a coupling in combination with the reduced ends of coaxial shafts, a casing having opposed bearings in its peripheral wall for receiving the end portions of the shafts, a coupling member arranged in the casing and located between the ends of the shafts and having its rounded outer ends bearing on the inner surface of the peripheral wall of the casing, the member being also provided with slots in its ends and with an annular groove medially of said ends, and a forked handle rotatably mounted in the side of the casing and engaged in the groove for rotating the member about a transverse axis.

In witness whereof I have hereunto signed my name.

VALENTIN JAKOB ODHNER.